US012713305B2

(12) United States Patent
Kong et al.

(10) Patent No.: US 12,713,305 B2
(45) Date of Patent: Aug. 18, 2026

(54) METHOD AND APPARATUS FOR MANAGING CELL IDENTIFICATION CONFLICT IN COMMUNICATION SYSTEM

(71) Applicant: Samsung Electronics Co., Ltd., Gyeonggi-do (KR)

(72) Inventors: Fanhua Kong, Beijing (CN); Hong Wang, Beijing (CN); Lixiang Xu, Beijing (CN); Weiwei Wang, Beijing (CN)

(73) Assignee: Samsung Electronics Co., Ltd (KR)

(*) Notice: Subject to any disclaimer, the term of this patent is extended or adjusted under 35 U.S.C. 154(b) by 318 days.

(21) Appl. No.: 18/337,830

(22) Filed: Jun. 20, 2023

(65) Prior Publication Data

US 2023/0413133 A1 Dec. 21, 2023

(30) Foreign Application Priority Data

Jun. 20, 2022 (CN) ........................ 202210699843.X

(51) Int. Cl.
*H04W 36/00* (2009.01)
*H04W 36/08* (2009.01)

(52) U.S. Cl.
CPC ... *H04W 36/0061* (2013.01); *H04W 36/0058* (2018.08); *H04W 36/08* (2013.01)

(58) Field of Classification Search
CPC ......... H04W 36/0061; H04W 36/0058; H04W 36/08; H04W 24/02; H04W 28/0289;
(Continued)

(56) References Cited

U.S. PATENT DOCUMENTS 11,218,921 B2 * 1/2022 Luo ........................ H04L 5/0091
2021/0044370 A1 * 2/2021 Abedini ................ H04W 16/10
(Continued)

FOREIGN PATENT DOCUMENTS

CN 112996061 6/2021
CN 113810215 A * 12/2021 .............. H04W 8/26
(Continued)

OTHER PUBLICATIONS

Qualcomm (Moderator), "Summary of Offline Discussion on IAB service interruption reduction", R3-205467, 3GPP TSG RAN WG3 Meeting #109-e, Sep. 2, 2020 (Year: 2020).*
(Continued)

*Primary Examiner* — Yuwen Pan
*Assistant Examiner* — Swati Jain
(74) *Attorney, Agent, or Firm* — The Farrell Law Firm, P.C.

(57) ABSTRACT

The disclosure relates to a 5G or 6G communication system for supporting a higher data transmission rate. Disclosed is a method of a first integrated access and backhaul (IAB) node in a communication system including receiving, from one of the second IAB node or a third IAB node, a first message, wherein the first message includes first information related to a physical cell identification (PCI) conflict of the second IAB node; and transmitting, to the second IAB node, a second message, wherein the second message includes second information of a PCI reallocated for the second IAB node based on the first information.

8 Claims, 11 Drawing Sheets

(58) Field of Classification Search
CPC ............. H04W 36/0009; H04W 40/34; H04W 36/087; H04W 40/36; H04W 84/047; H04W 8/22; H04W 36/0064; H04W 36/083; H04W 36/12; H04W 88/04; H04W 88/085; H04W 92/20
See application file for complete search history.

(56) References Cited

U.S. PATENT DOCUMENTS

| | | | | |
|---|---|---|---|---|
| 2021/0045170 | A1* | 2/2021 | Luo | H04W 24/02 |
| 2021/0051545 | A1* | 2/2021 | Luo | H04W 76/11 |
| 2021/0058835 | A1* | 2/2021 | Luo | H04L 5/0035 |
| 2021/0058854 | A1* | 2/2021 | Luo | H04W 88/08 |
| 2021/0377802 | A1* | 12/2021 | Liu | H04W 28/0862 |
| 2021/0410031 | A1* | 12/2021 | Akl | H04W 84/047 |
| 2022/0369177 | A1* | 11/2022 | Cao | H04W 36/0064 |
| 2022/0377641 | A1* | 11/2022 | Liu | H04W 76/30 |
| 2023/0100121 | A1* | 3/2023 | Liu | H04W 8/26 455/446 |
| 2023/0199575 | A1* | 6/2023 | Liu | H04W 36/08 370/331 |
| 2023/0309172 | A1* | 9/2023 | Zhu | H04W 12/106 |
| 2024/0251031 | A1* | 7/2024 | Bakker | H04L 69/28 |

FOREIGN PATENT DOCUMENTS

| | | |
|---|---|---|
| WO | WO 2021/034817 | 2/2021 |
| WO | WO 2021/098085 | 5/2021 |

OTHER PUBLICATIONS

Huawei : Integration of IAB Node II,3GPP Draft; R3-192803 (TP for NR IAB BL CR for TS 38.401 Integration of IAB-Node, 3rd Generation Partnership Project (3GPP), May 13, 2019 (May 13, 2019). (Year: 2019).*

Huawei: "TP for NR_IAB BL CR for TS 38.401: Integration of IAB node", 3GPP Draft; R3-194327, Aug. 17, 2019 (Year: 2019).*

Huawei: "IAB Node Integration Procedure", 3GPP Draft; R3-191834 IAB Node Integration Procedure, vol. RAN WG3, No. Xi'an, China; Apr. 8, 2019-Apr. 12, 2019 Apr. 6, 2019 (Year: 2019).*

ZTE Corporation et al: "Discussion on IAB node impact to CN", 3GPP Draft; R3-192516, vol. RAN WG3, May 4, 2019 (Year: 2019).*

Qualcomm (moderator), "Summary of Offline Discussion on IAB Service Interruption", R3-205467, 3GPP TSG-RAN WG3 #109-e, Aug. 17-27, 2020, 21 pages.

International Search Report dated Oct. 5, 2023 issued in counterpart application No. PCT/KR2023/008524, 7 pages.

Huawei, "Integration of IAB Node", R3-192803, 3GPP TSG-RAN WG3 Meeting #104, May 13-17, 2019, 7 pages.

Huawei, "(TP for NR_IAB BL CR for TS 38.401): Integration of IAB Node", R3-194327, 3GPP TSG-WG3 Meeting #105, Aug. 26-30, 2019, 6 pages.

Huawei, "IAB Node Integration Procedure", R3-191834, 3GPP TSG-RAN WG3 Meeting #103bis, Apr. 8-12, 2019, 6 pages.

ZTE Corporation, Sanechips, "Discussion on IAB Node Impact to CN", R3-192516, 3GPP TSG RAN WG3 Meeting #104, May 13-17, 2019, 4 pages.

European Search Report dated Aug. 28, 2025 issued in counterpart application No. 23827484.9-1206, 11 pages.

* cited by examiner

METHOD AND APPARATUS FOR MANAGING CELL IDENTIFICATION CONFLICT IN COMMUNICATION SYSTEM

CROSS-REFERENCE TO RELATED APPLICATION(S)

This application is based on and claims priority under 35 U.S.C. § 119 to Chinese Patent Application No. 202210699843.X, filed on Jun. 20, 2022, in the Chinese Intellectual Property Office, the disclosure of which is incorporated herein by reference in its entirety.

BACKGROUND

1. Field

The disclosure relates generally to the field of wireless communication, and more particularly, to a method and device for resolving a physical cell identification (PCI) conflict in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In order to meet an increasing demand for wireless data communication services since the deployment of the fourth generation (4G) communication system, efforts have been made to develop an improved fifth generation (5G) or pre-5G communication system. Therefore, the 5G or pre-5G communication system is also referred to as a beyond 4G network or post long term evolution (LTE) system.

Wireless communication is one of the most successful innovations in modern history. Recently, the number of wireless communication services subscribers has exceeded five billion, and the number of subscribers continues to rapidly grow. With the increasing popularity of smart phones and other mobile data devices (such as tablet computers, notebook computers, netbooks, e-book readers and machine-type devices) in consumers and enterprises, a demand for wireless data services is steadily increasing. To meet this rapid growth, therefore, it is of the utmost importance to improve efficiency and coverage of wireless interfaces.

SUMMARY

Accordingly, the present disclosure provides embodiments that are designed to address at least the problems and/or disadvantages described above and to provide at least the advantages described below.

In accordance with an aspect of the disclosure, a method of a first integrated access and backhaul (IAB) node in a communication system includes receiving, from one of the second IAB node or a third IAB node, a first message, wherein the first message includes first information related to a physical cell identification (PCI) conflict of the second IAB node; and transmitting, to the second IAB node, a second message, wherein the second message includes second information of a PCI reallocated for the second IAB node based on the first information.

In accordance with an aspect of the disclosure, a method of a second integrated access and backhaul (IAB) node in a communication system, includes transmitting, to a first IAB node, a first message, wherein the first message includes first information related to a physical cell identification (PCI) conflict of the second IAB node; receiving, from the second IAB node, a second message, wherein the second message includes second information related to a PCI reallocated for the second IAB node based on the first information; and reallocating the PCI based on the second information for a hand over of a user equipment (UE).

In accordance with an aspect of the disclosure, a network entity of a first integrated access and backhaul (IAB) node in a communication system includes a transceiver; and a controller coupled with the transceiver and configured to: receive, from one of the second IAB node or a third IAB node, a first message, wherein the first message includes first information related to a physical cell identification (PCI) conflict of the second IAB node, and transmit, to the second IAB node, a second message, wherein the second message includes second information of a PCI reallocated for the second IAB node based on the first information.

In accordance with an aspect of the disclosure, a network entity of a second integrated access and backhaul (IAB) node in a communication system includes a transceiver; and a controller coupled with the transceiver and configured to transmit, to a first IAB node, a first message, wherein the first message includes first information related to a physical cell identification (PCI) conflict of the second IAB node, receive, from the second IAB node, a second message, wherein the second message includes second information related to a PCI reallocated for the second IAB node based on the first information, and reallocate the PCI based on the second information for a hand over of a user equipment (UE).

In accordance with an aspect of the disclosure, a method performed by a first node in a communication system includes receiving a first message from a second node or a third node, wherein the first message includes first information related to a physical cell identification (PCI) conflict of the second node, and transmitting a second message to the second node, wherein the second message includes information related to PCI reallocated for the second node based on the first information.

In accordance with an aspect of the disclosure, a method performed by a first node in a communication system includes receiving a first message including first information related to a PCI conflict of a second node and/or cell related information of the second node from the second node, and transmitting a second message including second information related to a PCI conflict of the second node to a third node, wherein the second information is determined based on the first message.

In accordance with an aspect of the disclosure, a method performed by a first node in a communication system includes detecting a PCI conflict of the first node, transmitting a first message to a second node, wherein the first message includes first information related to the PCI conflict of the first node, and receiving a second message from the second node, wherein the second message includes information related to PCI reallocated for the first node.

In accordance with an aspect of the disclosure, a method performed by a first node in a communication system includes receive a first message from a second node, wherein the first message includes information related to a first set of PCIs, the first set of PCIs including multiple candidate PCIs of the first node, and if a PCI conflict occurs during the migration to a second node using a first candidate PCI in the first set of PCIs, selecting a second candidate PCI in the first set of PCIs for migration.

In accordance with an aspect of the disclosure, a method performed by a first node in a communication system includes receiving a first message from a second node, wherein the first message includes information related to a reconfigured PCI of the first node, and performing migration to a third node using the reconfigured PCI, wherein the reconfigured PCI is determined based on a first set of PCIs, and wherein the first set of PCIs includes a set of PCIs that can be used by a node associated with the third node and/or a set of PCIs that cannot be used by the node associated with the third node.

In accordance with an aspect of the disclosure, a method performed by a first node in a communication system includes receiving a first message from a second node, wherein the first message includes information related to a reconfigured PCI of the first node, and performing migration to a third node using the reconfigured PCI, wherein the reconfigured PCI is determined based on a first set of PCIs, and wherein the first set of PCIs includes a set of PCIs that can be used by a node associated with the third node and/or a set of PCIs that cannot be used by the node associated with the third node.

In accordance with an aspect of the disclosure, a method performed by a first node in a communication system includes acquiring a first set of PCIs, and updating the first set of PCIs based on information related to a PCI of a second node migrated to the first node.

In accordance with an aspect of the disclosure, a method performed by a first node in a communication system includes receiving a second message from a second node, wherein the second message includes first information related to a PCI, and transmitting a third message to a third node based on the first information, wherein the third message includes second information related to migration of the third node to the second node.

In accordance with an aspect of the disclosure, a method performed by a first node in a communication system includes receiving a fifth message from a second node, wherein the fifth message includes information related to a migration type supported by the second node, and determining a target node for migration based on the information related to the migration type supported by the second node.

BRIEF DESCRIPTION OF DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
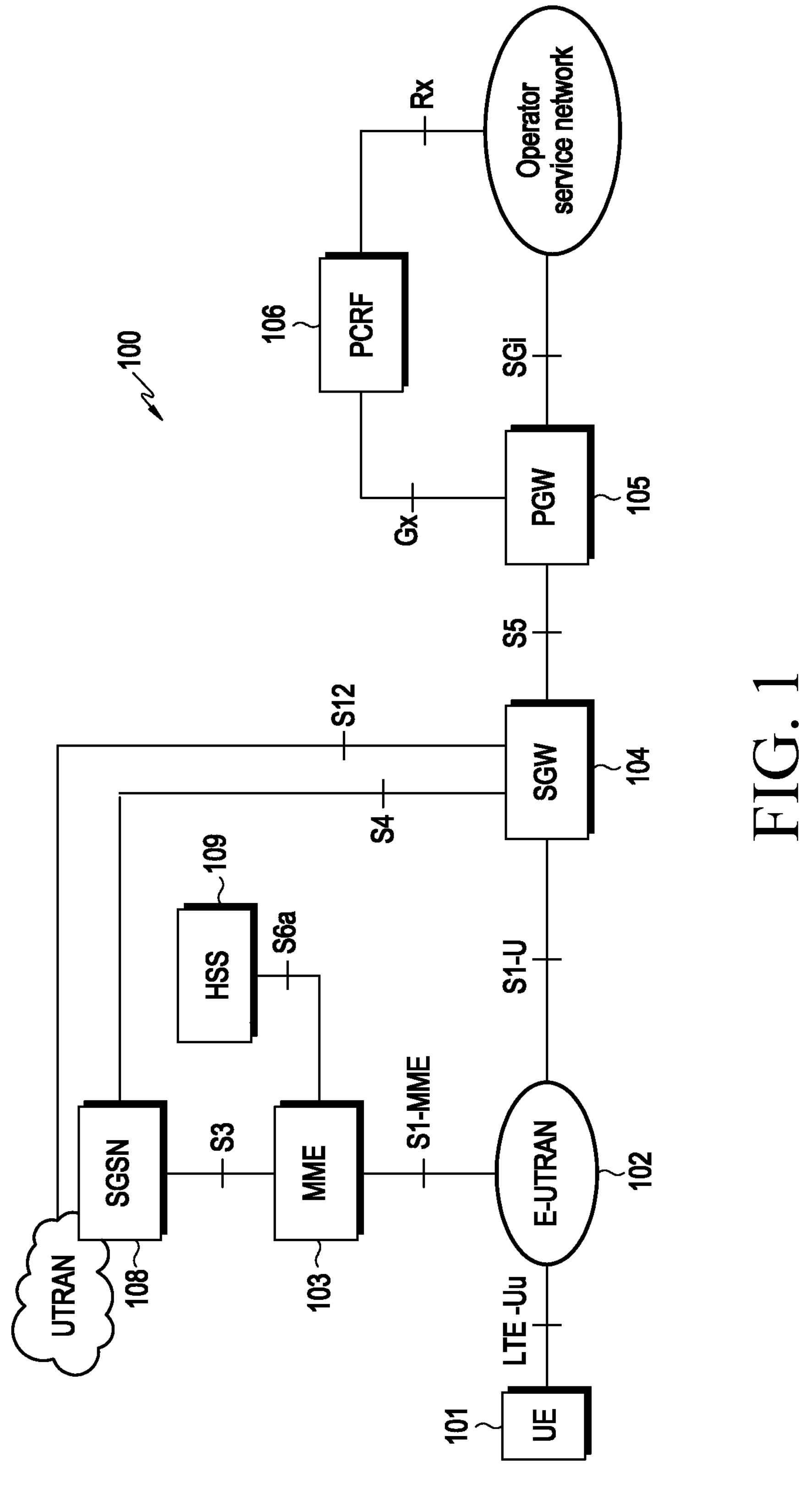
FIG. 1 illustrates a system architecture of the system architecture evolution (SAE), according to an embodiment.

The following description with reference to the accompanying drawings is provided to assist in a comprehensive understanding of embodiments of the disclosure. It includes various specific details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of embodiments of the disclosure is provided for illustration purposes only and not for the purpose of limiting the present disclosure.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in embodiments of the disclosure includes any or all of combinations of listed words. For example, the expression "A or B" may include A, may include B, or may include both A and B.

The message names herein are merely examples, and other message names may be used. Terms such as "first" and "second" included in the message names herein are merely examples of the messages, and do not represent the performing order. The steps in individual processes may be performed in combination with each other or independently. The performing steps of each process are merely examples, and other possible performing orders are not excluded.

Herein, the base station may be a 5G base station (such as gNB, ng-eNB), a 4G base station (such as eNB), a sixth generation (6G) base station, or other types of access nodes.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the same meanings as the contextual meanings in the relevant field of art and are not to be interpreted to have ideal or excessively formal meanings unless clearly defined in the present disclosure.

For convenience herein, descriptions such as migrating node and migrating integrated access backhaul (IAB) node are used to represent a node that needs to be migrated. Throughout the description, there is no distinction between migration and handover, that is, the migration and handover may represent roughly the same meaning. In addition, the target path herein refers to a communication path from the migrating node to the target donor node in a handover scenario, including a parent node of the migrating node (i.e., a target parent node) and possibly one or more intermediate IAB nodes (or the target path may only include the target parent node and the target donor node). Similarly, the source path refers to a communication path from the migrating node to a source donor node before handover in the handover scenario, including a parent node of the migrating node (i.e., a source parent node) and possibly one or more intermediate IAB nodes (or the source path may only include the source parent node and the source donor node).

In 5G communication technology, since a higher frequency point is used, 5G has a faster transmission speed than 4G; however, the higher frequency point will also cause a shorter transmission distance, so more base stations need to be deployed in a 5G network to ensure the coverage of the 5G network. Due to environmental or cost limitations, it is impossible to deploy base stations normally in some areas, so IAB technology is disclosed to resolve the lack of 5G base station coverage in these areas, so as to ensure the normal communication of users. The process of IAB network establishment was determined in the third generation partnership project (3GPP) release 16 (R16) standard meeting, and the partial migration and the transmission process of data packets in the IAB network were further determined in the release 17 (R17) standard meeting. More in-depth research will be conducted on mobile IAB nodes and full migration in the upcoming release 18 (R18) standard.

In the IAB architecture, data transmission between a UE and a donor node may be performed through one or more relay nodes (RNs) which may be referred to as IAB nodes.

The donor node may be a device for communicating with the UE, and specifically, any one of an access point (AP) in a wireless local area network (WLAN), a base transceiver station (BTS) in global system for mobile communication (GSM) or code division multiple access (CDMA), a base station (Node B, NB) in wideband code division multiple access (WCDMA), an evolutional node B (eNB) in an LTE system, a relay station or access point, an vehicle mounted device, a wearable device, an access network device in a future 5G network, and an access network device in a future evolved public land mobile network (PLMN), for example.

The UE may be referred to as a mobile station, an access terminal, a subscriber unit, a subscriber station, a mobile station, a remote station, a remote terminal, a mobile device, a terminal, a wireless communication device, a user agent or user device, a station (ST) in a wireless local area network (WLAN), a cellular phone, a cordless phone, a session initiation protocol (SIP) phone, a wireless local loop (WLL) station, a personal digital assistant (PDA), a handheld device with a wireless communication function, a computing device, other processing devices connected to a wireless modem, an vehicle mounted device, a wearable device, a mobile station in a future 5G network, and a terminal device in a future evolved public land mobile network (PLMN), for example.

A communication connection may be established between the UE and the IAB node, the IAB node may establish a communication connection with the donor node, and the donor node provides the IAB node with a gateway function including providing the IAB node with a data forwarding or routing function, with an interworking interface function between IAB nodes, such as an S1 or X1 or X2 or Xn interface function, or with a higher layer protocol function, e.g., packet data convergence protocol (PDCP) and radio resource control (RRC) functions; and a communication connection may be established between IAB nodes, such as the S1 or X1 or X2 or Xn interface.

The link between the IAB node and the donor node may be referred to as a backhaul (BH) link, and the link between the UE and the IAB node may be an access (AC) link. The IAB node regards a node that provides it with a BH service as a parent node, and the parent node may be referred to as a superior node of the IAB node.

FIG. 1 illustrates a system architecture 100 of the system architecture evolution (SAE), according to an embodiment. In FIG. 1, UE 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
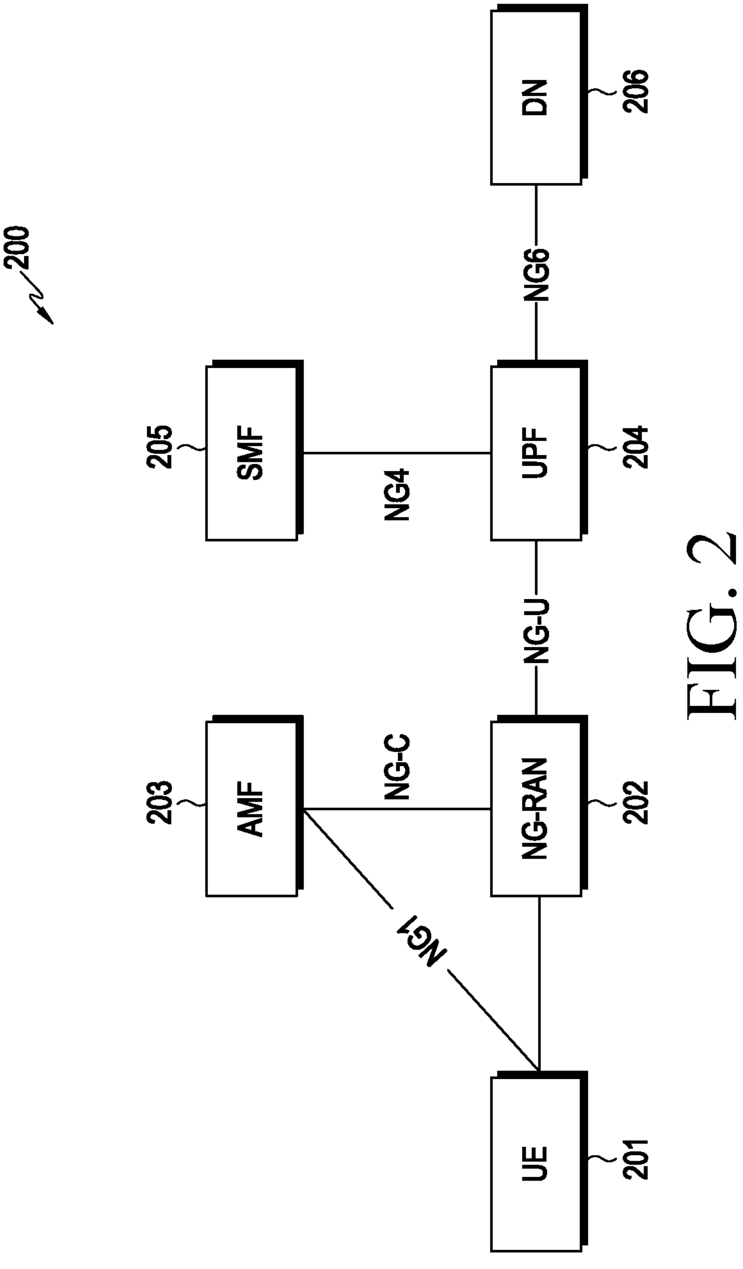
FIG. 2 illustrates a 5G system architecture, according to an embodiment.

FIG. 2 illustrates a system architecture 200 according to an embodiment.

In FIG. 2, UE 201 is a terminal device for receiving data. A next generation (NG) radio access network (RAN) 202 includes a base station (a gNB or an eNB connected to 5G core network (5GC), also referred to as an ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 may include services of operators, access of Internet and service of third parties.

Figure 3:
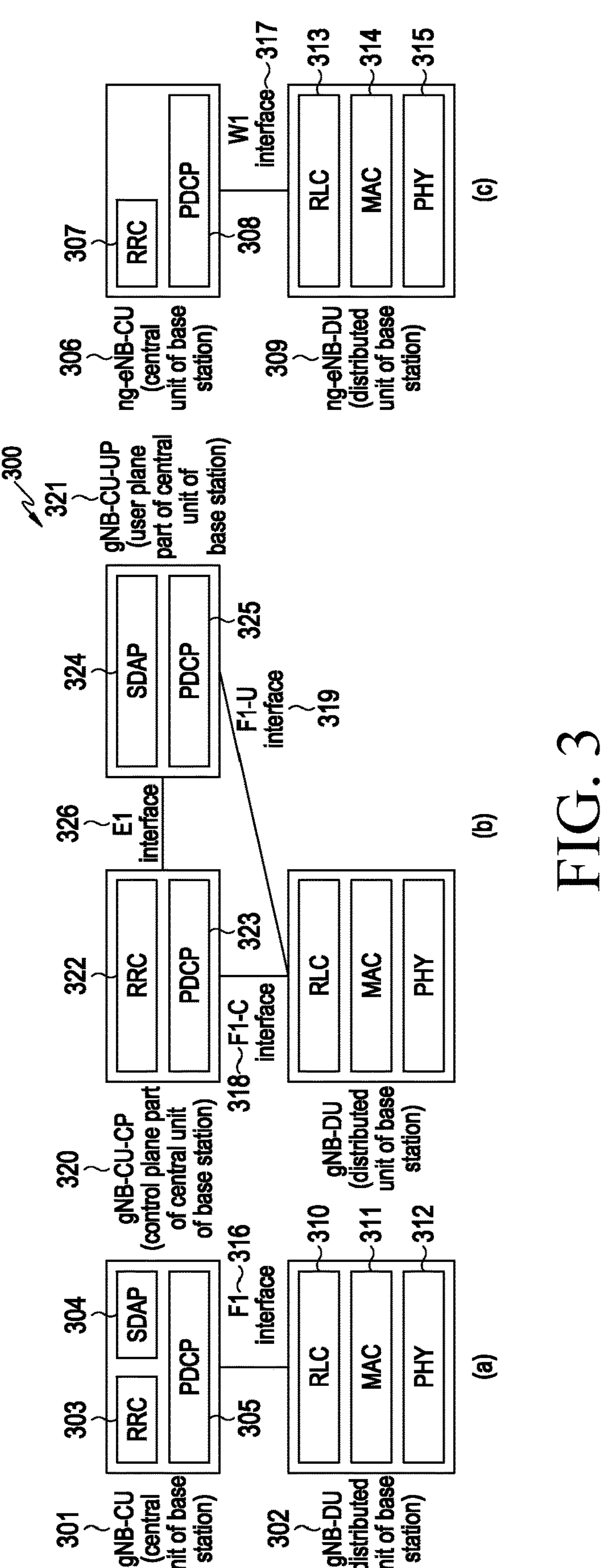
FIG. 3 illustrates a base station structure, according to an embodiment.

FIG. 3 illustrates a base station structure 300, according to an embodiment. In an NR system, in order to support network function virtualization, more efficient resource management and scheduling, a base station (gNB/ng-eNB) providing wireless network interface for a UE may be further divided into a gNB central unit gNB-CU/ng-eNB-CU (gNB central unit/ng-eNB central unit) 301, 306 and a distributed unit gNB-DU/ng-eNB-DU (gNB distributed unit/ng-eNB distributed unit) 302, 309, as shown in FIG. 3.

The gNB-CU 301 has a radio resource control (RRC) 303, service data adaptation protocol (SDAP) 304 and packet data convergence protocol (PDCP) 305 layers, and the ng-eNB-CU 306 has RRC 307 and PDCP 308 layers. The gNB-DU/ng-eNB-DU 302, 309 has radio link control (RLC) 310, 313 protocol, medium access control (MAC) 311, 314 and physical 312, 315 layers, and the like. There is a standardized public interface F1 316 between gNB-CU 301 and gNB-DU 302, and a standardized public interface W1 317 between ng-eNB-CU 306 and ng-eNB-DU 309. The F1 interface 316 is divided into a control plane F1-C 318 and a user plane F1-U 319. The transport network layer of F1-C 318 is based on Internet protocol (IP) transmission. In order to transmit signaling more reliably, stream control transmission protocol (SCTP) protocol is added to IP. The application layer protocol is F1AP, as in 3GPP TS38.473. SCTP may provide a reliable application layer message transmission. The transport layer of F1-U 319 interface is UDP/IP, and GTP-U is used to carry a user plane protocol data unit (PDU) over UDP/IP.

As shown in section (b) of FIG. 3, the gNB-CU 301 may include gNB-CU-CP (a control plane part of the central unit of the base station) 320 and gNB-CU-UP (a user plane part of the central unit of the base station) 321. The gNB-CU-CP 320 contains the function of the control plane of the base station and has RRC 322 and PDCP 323 protocol layers, and gNB-CU-UP 321 contains the function of the user plane of the base station and has SDAP 324 and PDCP 325 protocol layers. There is a standardized public interface E1 326 between gNB-CU-CP 320 and gNB-CU-UP 321, and the protocol is E1AP, as in 3GPP TS38.463. The interface between the control plane part of the central unit of the base station and the distributed unit of the base station is the F1-C interface 318, that is, a control plane interface of F1, and the interface between the user plane part of the central unit of the base station and the distributed unit of the base station is F1-U interface 319, that is, a user plane interface of the F1 interface 316. In the NR system, the base station which provides an evolved universal terrestrial radio access (E-UTRA) user plane and control plane and accesses to a 5G core network is referred to as an ng-eNB. In order to support virtualization, the ng-eNB may also be further divided into a central unit ng-eNB-CU (gNB central unit/ng-eNB central unit) 306 and a distributed unit ng-eNB-DU 309, as shown in section (c) of FIG. 3. The ng-eNB-CU 306 has RRC 307 and PDCP 308 layers. The ng-eNB-DU 309 has RLC 313, MAC 314 and physical 315 layers. There is a standardized public interface W1 317 between ng-eNB-CU 306 and ng-eNB-DU 309. The W1 interface 317 is divided into a control plane W1-C and a user plane W1-U. The transport network layer of W1-C is based on IP transmission. The SCTP protocol is added to IP in order to transmit signaling more reliably. The application layer protocol is W1AP, as in 3GPP TS37.473. The transport layer of W1-U is UDP/IP, and GTP-U is used to carry a user plane PDU over the UDP/IP.

An IAB node is considered to be fixed in R17, so when the IAB node encounters wireless performance degradation and needs to be migrated (hereinafter referred to as a migrating node), a source IAB donor CU may perform partial migration according to a measurement report of the migrating node, and migrate RRC signaling of the migrating node to a target path. Partial migration may be insufficient for the mobile IAB nodes, and it may also be necessary to move an F1 connection to the target path (target leg), that is, migrate the F1 interface between a migrating node DU and the source IAB donor CU to a target IAB donor CU.

Figure 4:
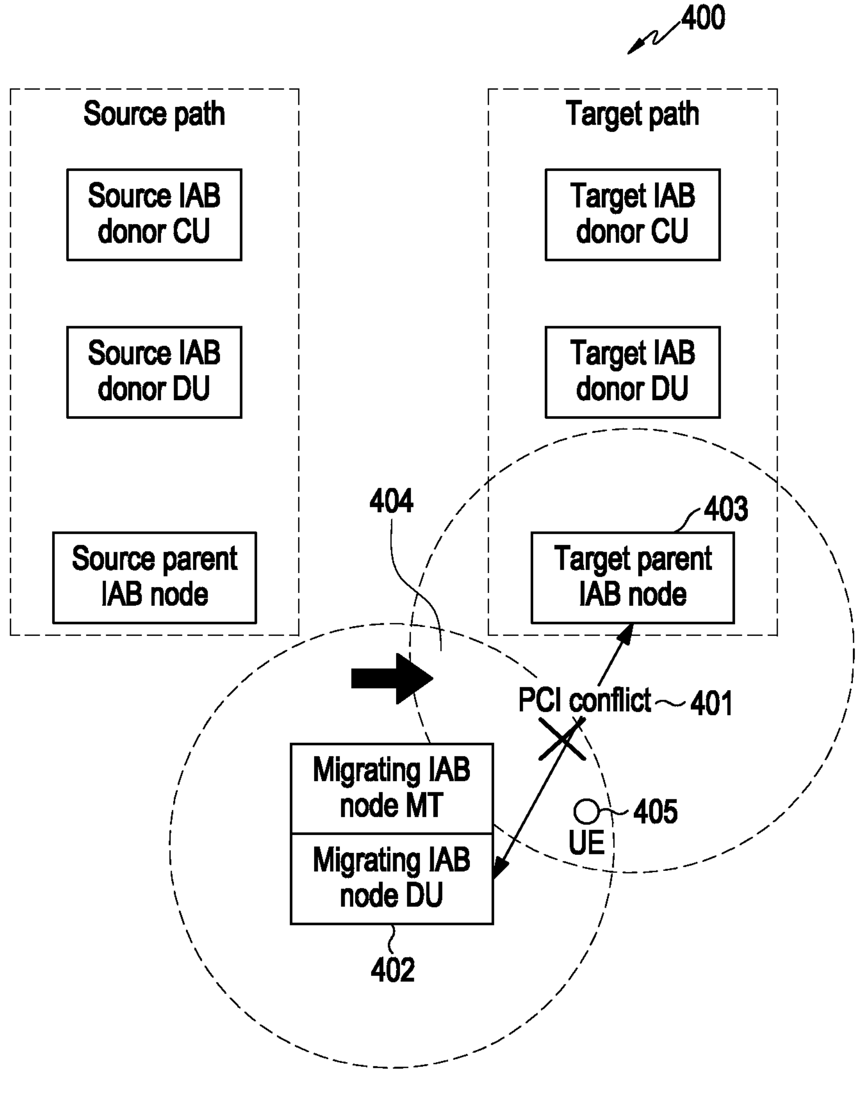
FIG. 4 illustrates a PCI conflict, according to an embodiment.

FIG. 4 illustrates a PCI conflict 400, according to an embodiment. Specifically, the conflict 401 may occur between PCIs of a migrating node DU 402 and a target parent IAB node 403 or other target IAB nodes in the target path, such that the PCIs of both nodes are identical, as shown in FIG. 4. If the PCI conflict 401 occurs, the PCI conflict 401 will cause a DL synchronization delay in an overlapping area 404, a block error rate (BLER) is high and decoding of a physical channel scrambled using the PCI fails, and handover of a UE 405 fails.

Accordingly, disclosed herein is a method and apparatus for avoiding or resolving the problem of the PCI conflict when the migrating node performs full migration, so as to mitigate service interruption of users served by the migrating node. That is, the disclosure teaches how to avoid the occurrence of the PCI conflict before the conflict occurs, how to detect, report occurrence and resolve the PCI conflict after the conflict occurs, how to avoid the PCI conflict between migrating nodes, and how to inform the target IAB donor CU and 5GC of the migration type (that is, whether the partial migration or the full migration is performed), so that the migration can be performed normally.

A first aspect disclosed herein is avoiding the occurrence of the PCI conflict before the PCI conflict occurs.

Figure 5:
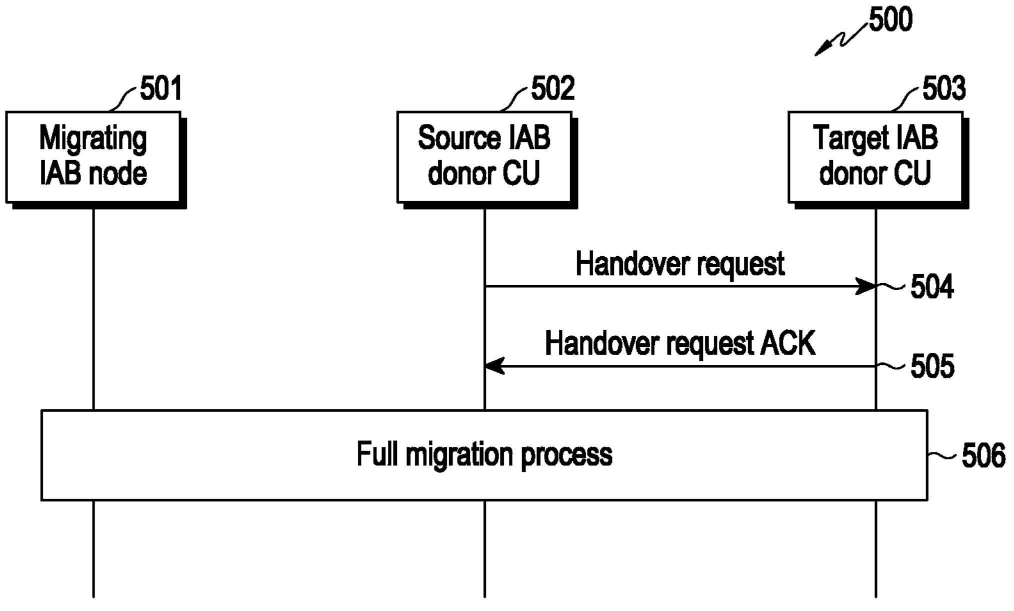
FIG. 5 illustrates providing assistance information by a source IAB donor CU, according to an embodiment.

FIG. 5 illustrates providing assistance information 500 by a source IAB donor CU, according to an embodiment. Specifically, when a migrating IAB node 501 is in the source path, its PCI may be determined by a source IAB donor CU 502. When a full migration process 506 is performed, if there is assistance information interaction between the source IAB donor CU 502 and a target IAB donor CU 503, occurrence of a subsequent PCI conflict may be avoided. One case may be that the source IAB donor CU 502 provides the assistance information for the target IAB donor CU 503, as shown in FIG. 5 and described as follows.

The source IAB donor CU 502 determines whether to perform full migration for the migrating node according to a measurement report of the migrating node 501, and if so, the source IAB donor CU 502 adds first assistance information to a handover request 504 and transmits the information to the target IAB donor CU 503. The first assistance information may be PCI information corresponding to a cell of a migrating IAB node 501, and may also be a list of cells of the migrating IAB node 501 and corresponding information related to PCI.

The target IAB donor CU 503 configures first configuration information for a migrating IAB node according to the first assistance information in the handover request 504. The first configuration information is related to the target path configured by the target IAB donor CU 503 for the migrating node.

There will be no conflict between PCIs of a target IAB node in the target path in the configuration information and the migrating IAB node 501.

Herein, the first configuration information may be embodied as a corresponding behavior of the target IAB donor CU 503 after receiving the first assistance information, and may also be embodied in a handover request acknowledgement (ACK) 505.

The migrating IAB node 501 performs a full migration process 506 after receiving the first configuration information configured by the target IAB donor CU 503.

Figure 6:
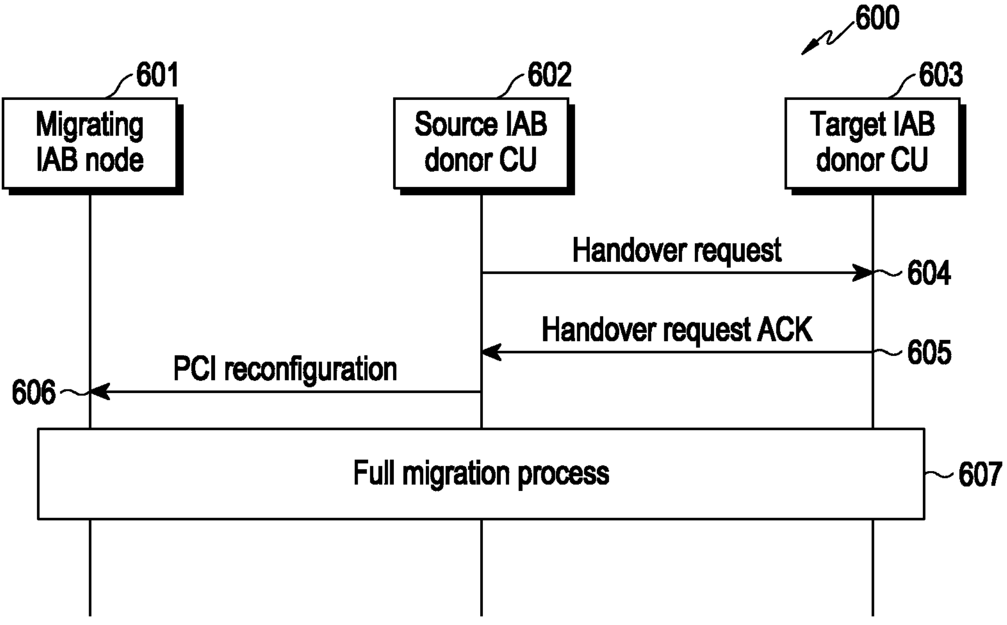
FIG. 6 illustrates providing assistance information by a target IAB donor CU, according to an embodiment.

FIG. 6 illustrates providing assistance information 600 by a target IAB donor CU, according to an embodiment. In FIG. 6, a target IAB donor CU 603 provides the assistance information for a source IAB donor CU 602, pursuant to the following. The source IAB donor CU 602 determines whether to perform full migration for a migrating IAB node 601 according to a measurement report of the migrating IAB node 601, and if so, transmits a handover request 604 to the target IAB donor CU 603.

The target IAB donor CU 603 configures second configuration information for the migrating IAB node 601 according to the handover request 604, adds the second configuration information to a handover request ACK 605, and transmits the second configuration information to the source IAB donor CU 602. The second configuration information is related to the target path configured by the target IAB donor CU 603 for the migrating IAB node 601. The configuration information may include information related to PCI of the target parent IAB node, may include information related to PCIs of all target IAB nodes in the target path, and may include information related to locations and PCI of all target IAB nodes in the target path. The source IAB donor CU 602 determines whether the PCI conflict occurs according to the second configuration information, that is, whether the PCI of the migrating IAB node 601 is the same as that in the second configuration information. If so, the source IAB donor CU 602 determines that the PCI conflict occurs, and then reconfigures 606 the PCI of the migrating IAB node 601.

The migrating IAB node 601 performs a full migration process 607 with the updated PCI.

A second aspect disclosed herein is resolving the PCI conflict after the PCI conflict occurs.

Figure 7:
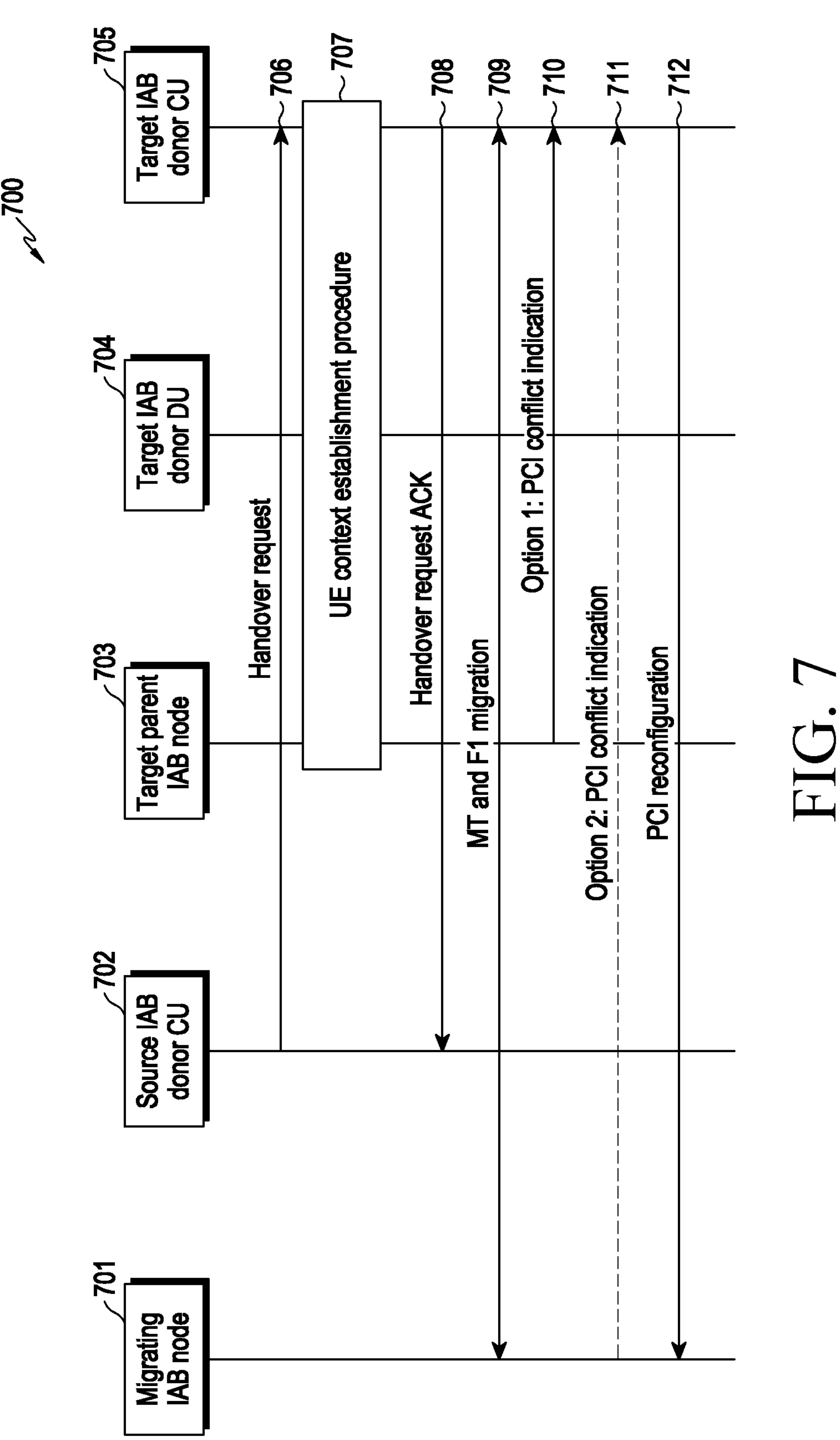
FIG. 7 illustrates resolving a PCI conflict when an F1-C connection has been established on a target path, according to an embodiment.

FIG. 7 illustrates resolving a PCI conflict 700 when an F1-C connection has been established on a target path, according to an embodiment. Specifically, when the migrating IAB node 701 performs full migration, the PCI conflict may occur if no enhancement is performed in the handover process. To mitigate or eliminate the adverse effects of the PCI conflict, it is necessary to study how to find and resolve the PCI conflict. When the PCI conflict occurs, one case is when the migrating IAB node 701 has established the F1-C connection on the target path. The process of finding and resolving the PCI conflict is shown in FIG. 7, which teaches the following.

In step 706, the source IAB donor CU 702 initiates a handover (HO) process via a handover request 706.

In step 707, the target IAB donor CU 705 configures a target path for the migrating node and transmits the configured target path related information to the source IAB donor CU 702 via handover request ACK in step 708. In exemplary embodiment, the source IAB donor CU 702 transmits the configured target path related information to the migrating IAB node 701 via an RRC reconfiguration.

In step 709, the migrating IAB node 701 initiates MT and F1 migration and finds the PCI conflict. Specifically, the UE served by the migrating IAB node 701/target parent IAB node 703 finds the PCI conflict and reports it to the migrating IAB node 701/target parent IAB node 703 via a first indication information, which may be reported via the measurement report, UE assistance information or other RRC messages, may be carried in an IE, or may be reported with a new IE.

Alternatively, the PCI conflict may be found when a RACH procedure is performed during the migrating node mobile terminal (MT) establishment procedure. A second indication information is added in msg1, msg3 or msg5 and transmitted to the target parent IAB node, and the target parent IAB node finds the PCI conflict. The second indication information includes information related to PCI of a cell of the migrating node, or includes information related to a list of cells of the migrating node and the corresponding PCI.

For processing when the PCI conflict is found, if the UE served by the migrating IAB node/target parent IAB node finds the PCI conflict, the migrating IAB node/target parent IAB node transmits to the target IAB donor CU third indication information, which may only include an indication of the PCI conflict, may include information related to PCI corresponding to a DU cell of the migrating IAB node, or may include information related to a list of DU cells and corresponding PCI in step 710, 711.

If the target parent IAB node 703 finds the PCI conflict during the migrating node MT establishment procedure, the target parent IAB node 703 transmits to the target IAB donor CU fourth indication information, which may only include an indication of the PCI conflict, may include information related to PCI of a cell of the migrating node, or may include information related to a list of cells of the migrating node and corresponding PCI in step 710.

In step 712, according to the third indication information or the fourth indication information, the target IAB donor CU 705 reallocates a PCI for a newly accessed migrating IAB node to resolve the PCI conflict.

Figure 8:
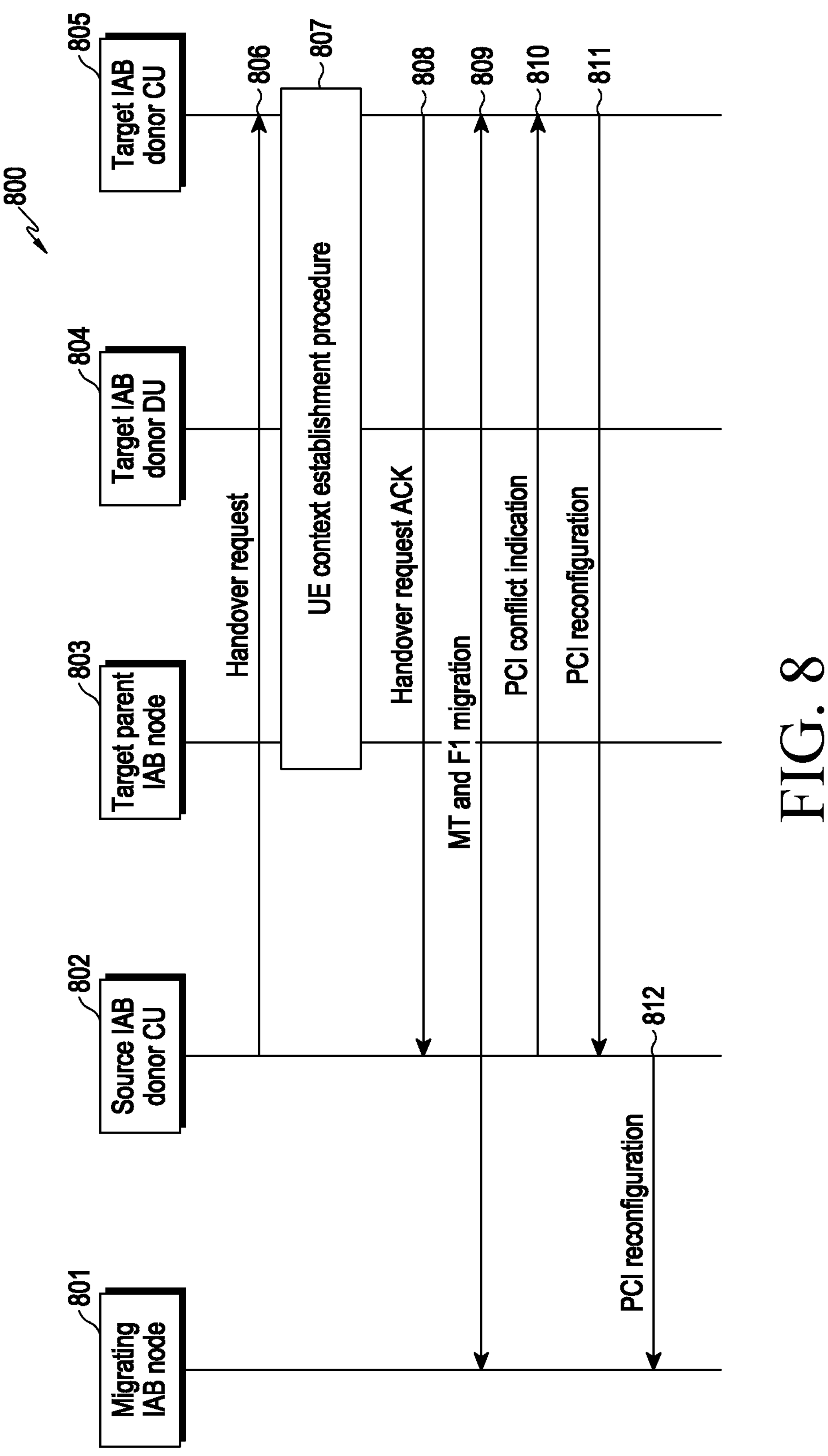
FIG. 8 illustrates resolving a PCI conflict when an F1-C connection has not been established on a target path, according to an embodiment.

FIG. 8 illustrates resolving a PCI conflict when an F1-C connection has not been established on a target path, according to an embodiment. Specifically, after the PCI conflict occurs, another case is that the migrating IAB node has not established the F1-C connection on the target path. The process of finding and resolving the PCI conflict is shown in FIG. 8. That is, the source IAB donor CU 802 determines whether to perform a migration process according to a measurement report of the migrating node 801 and initiates a HO process via a handover request 806 in a case that the handover process is determined to be performed.

The target IAB donor CU 805 configures target path related information for the migrating node 801 and transmits it to the source IAB donor CU 802 via handover request ACK 808.

The migrating IAB node 801 initiates MT and F1 migration 809 and finds the PCI conflict. The UE served by the migrating IAB node 801 finds the conflict and reports it to the source IAB donor CU 802. Alternatively, the source IAB donor CU 802 finds the conflict via a measurement report of the migrating node 801. That is, the source donor CU 802 performs a measurement configuration for the migrating node 801, and the migrating node 801 measures according to the configuration and reports the measurement result to the source donor CU 802. When the source donor CU 802 finds that different cell IDs corresponding to the frequency point have the same PCI, the source donor identifies a PCI conflict and the cell IDs involved.

Thus, the source IAB donor CU 802 transmits fifth indication information to the target IAB donor CU 805 via an Xn interface. The fifth indication information may be only an indication of the PCI conflict, may be related to PCI of a cell of the migrating node 801, or may be related to a list of cells of the migrating node 801 and corresponding PCI.

In step 811 The target IAB donor CU 805 transmits third configuration information to the source IAB donor CU 802 via the Xn interface according to the fifth indication information.

The third configuration information is related to PCI reallocated by the target IAB donor CU 805 for the migrating node 801 with a conflict. The source IAB donor CU 802 reconfigures the migrating node 801 according to the third configuration information transmitted by the target IAB donor CU.

A third aspect disclosed herein is avoiding the PCI conflict between migrating nodes.

The disclosure teaches avoiding or resolving the PCI conflict in the process of the migrating node accessing the target path, but the PCI conflict among multiple migrating nodes in the target path may still exist in some cases. For example, migrating node 1 and migrating node 2 do not locate the PCI conflict with each other because they are far away when accessing the target path; however, when migrating node 1 and migrating node 2 move closer, there will still be the possibility of the PCI conflict. The conflict can be resolved by the source IAB donor CU configuring multiple PCIs for the migrating node, pursuant to the following procedure.

When the migrating IAB node performs IAB integration, the source IAB donor CU configures a first PCI and multiple second PCIs for the migrating IAB node. The first PCI may be referred to as a primary PCI, and the second PCIs may be referred to as secondary PCIs. In addition to configuring multiple PCIs, the source IAB donor CU may configure a corresponding priority for each of the second PCIs. The priority may be set by the IAB donor CU through implementation, such as based on the probability of the PCI conflict (for example, the corresponding priority is high for low probability of PCI conflict) and may also depend on the operator's strategy. When a HO is performed, the source IAB donor CU may add sixth indication information to a handover request and transmits it to the target IAB donor CU. The sixth indication information includes configuration information of the above multiple PCIs. The target IAB donor CU may continue using the PCI configuration after the IAB node performs full migration or may modify or reconfigure the configuration according to the actual case, so that the primary PCI and secondary PCIs of the migrating node may better conform to the actual communication situation.

Figure 9:
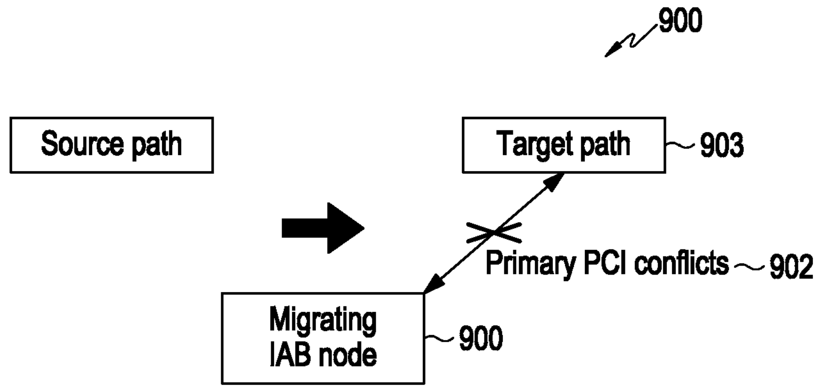
FIG. 9 illustrates changing a primary PCI to a secondary PCI, according to an embodiment.

FIG. 9 illustrates changing a primary PCI to a secondary PCI 900, according to an embodiment.

When the migrating IAB node 901 with primary PCI is after the HO, if the migrating IAB node 901 with primary PCI finds a conflict with the PCI of the target parent node 903 (or target path) as shown in FIG. 9, the migrating node 901 may randomly select one from the multiple second PCIs as the enabled PCI. If the source IAB donor CU has configured priorities of the second PCIs, the migrating node selects a second PCI with the highest priority as the enabled PCI.

Specifically, if there is no conflict with the PCI of the target parent node, application of the first PCI is maintained.

When the migrating IAB node with secondary PCI is after HO, if the migrating IAB node with secondary PCI finds a conflict with the PCI of the target parent node, the PCI is preferentially changed to be the first PCI.

Figure 10:
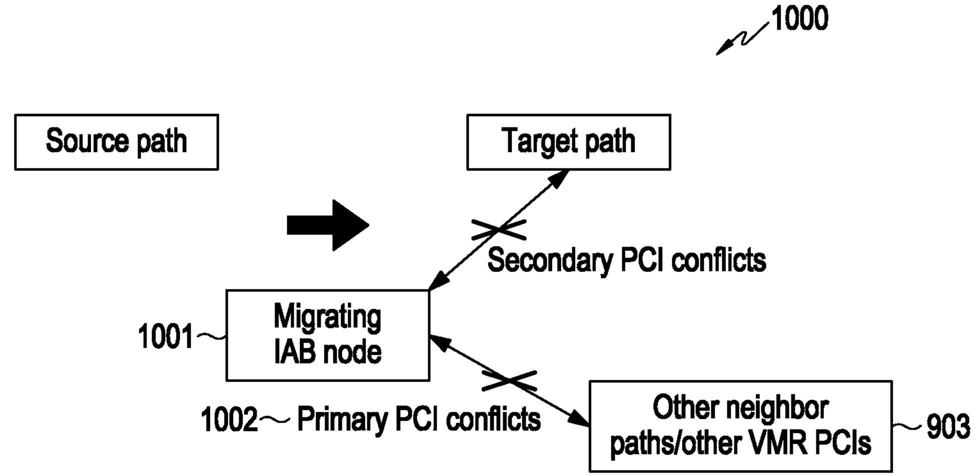
FIG. 10 illustrates when a conflict occurs for both a primary PCI and a secondary PCI being applied, according to an embodiment.

FIG. 10 illustrates when a conflict occurs for both a primary PCI and a secondary PCI being applied 1000, according to an embodiment. Specifically, if the first PCI also conflicts 1002 with the PCI of other IAB nodes, one of the second PCIs without the PCI conflict is randomly selected as the enabled PCI, as shown in FIG. 10 which illustrates the PCI conflict of vehicle mounted relays (VMRs) 1003. However, it should be understood that the principle of the method may also be applied to other cases of the PCI conflict. If the source IAB donor CU has configured priorities of the second PCIs, the migrating IAB node 1001 selects a second PCI with the highest priority and without a PCI conflict to change.

Figure 11:
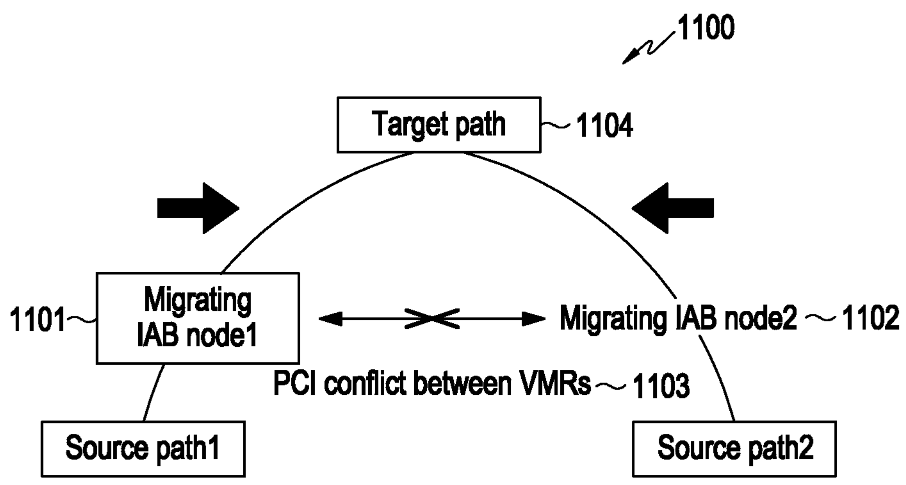
FIG. 11 illustrates configuring a set of PCIs by a target IAB node, according to an embodiment.

FIG. 11 illustrates configuring a set of PCIs by a target IAB node 1100, according to an embodiment. That is, the PCI conflict 1103 between migrating IAB nodes 1101, 1102 may also be avoided through the IAB donor CU configuring a set of PCIs for IAB nodes in its target path 1104, as shown in FIG. 11. The target IAB donor CU configures a set of PCIs for the target IAB node in the target path 1104, wherein the set of PCIs can/cannot be used by the IAB node accessing the target IAB node.

When migrating IAB node 1 1101 moves to the target path 1104, the source IAB donor CU1 corresponding to the migrating IAB node 1 1101 transmits a handover request to the target donor CU.

The target IAB donor CU adds seventh indication information to a first message and then transmits the seventh indication information to a source IAB donor CU1. The seventh indication information is configuration information related to a set of PCIs, and the first message may be a handover request ACK.

The source IAB donor CU1 adjusts a PCI of a migrating IAB node 1 1101 according to the seventh indication information. That is, if the PCI of a migrating IAB node 1 1101 does not belong to the set of PCIs that can be used or belongs to the set of PCIs that cannot be used, the source IAB donor CU1 reconfigures its PCI.

The source IAB donor CU1 may transmit eighth indication information to the target IAB donor CU via the Xn interface, where the eighth indication information includes the adjusted PCI of the migrating IAB node 1 DU. The target IAB donor CU may update the set of PCIs according to the eighth indication information by deleting the updated PCI of the migrating IAB node 1 DU from the set of PCIs that can be used or adding the updated PCI of the migrating IAB node 1 DU to the set of PCIs that cannot be used. The source IAB donor CU1 transmits the adjusted PCI of the migrating IAB node 1 DU 1101 to the target IAB donor CU, which can enable the target IAB donor CU to update the set of PCIs in a more timely fashion, and avoid a potential PCI conflict when another migrating node also migrates to the target IAB donor CU while the migrating IAB node 1 1101 migrates to the target IAB donor CU.

When migrating IAB node 2 1102 also moves to the target path 1104, a source IAB donor CU2 transmits a handover request to the target IAB donor CU.

The target IAB donor CU adds ninth indication information to a second message and transmits it to the source IAB donor CU2. The ninth indication information includes the updated set of PCIs of the target IAB donor CU, and the second message may be a handover request ACK.

The source IAB donor CU2 adjusts a PCI of a migrating IAB node 2 1102 according to the ninth indication information, and the adjustment process is the same as that of the source IAB donor CU1, so as to avoid the PCI conflict between migrating nodes.

When the migrating node served by the target IAB node moves to another target IAB donor CU, the PCI of the migrating node will be released, so that the released PCI may be added to the set of PCIs that can be used or deleted from the set of PCIs that cannot be used to obtain the updated set of PCIs. This updated set is transmitted to the source IAB donor CU connected with the migrating node newly accessing to the target IAB donor CU in the future.

Figure 12:
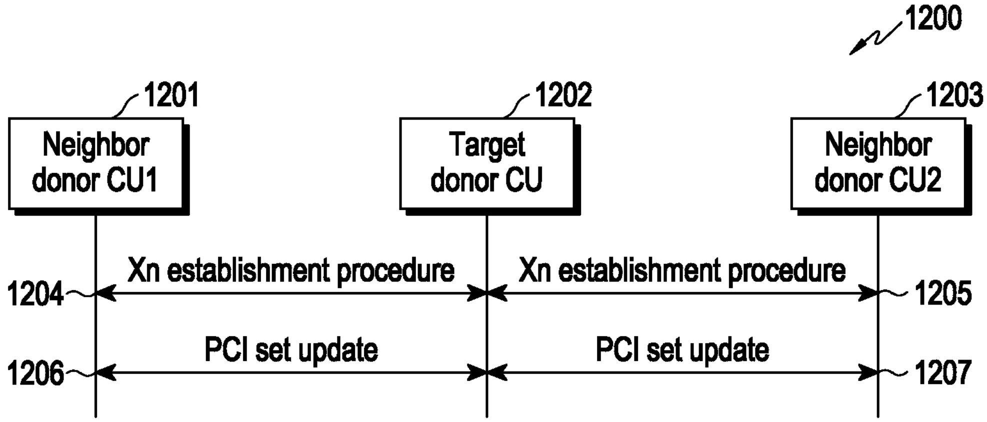
FIG. 12 illustrates interacting a set of PCIs on an Xn interface, according to an embodiment.

FIG. 12 illustrates interacting a set of PCIs on an Xn interface 1200, according to an embodiment. That is FIG. 12 illustrates when the IAB donor CU configures a set of PCIs for IAB nodes in its path. When the target IAB donor CU 1202 establishes an Xn interface with a neighbor donor CU 1201, tenth indication information is added in an Xn establishment procedure 1204 and includes a set of PCIs related to target IAB nodes controlled by the target IAB donor CU 1202 (for example, all IAB nodes in the target path; alternatively, if the limitation of the amount of data interaction of the Xn interface is considered, a part of IAB nodes in the target path, including when IAB nodes are directly connected with the donor node). The set of PCIs can/cannot be used by IAB nodes controlled by the target IAB node.

When a migrating node served by the neighbor donor CU1 1201 moves to the target IAB node, if a PCI conflict is found according to the tenth indication information, the neighbor donor CU changes the PCI of its migrating node.

The neighbor donor CU may transmit the changed PCI to the target IAB donor CU 1202, so that the target IAB donor CU 1202 may update (1206. 1207) the set of PCIs between the neighbor donor CU1 1201 and the neighbor donor CU2 1203.

When the set of PCIs of the target IAB node is updated, the target IAB donor CU 1202 transmits eleventh indication information to the neighbor donor CU2 1203 via the Xn establishment procedure 1205. The eleventh indication information includes the updated set of PCIs of the target IAB node.

A fourth aspect disclosed herein concerns indicating the migration type of the target IAB donor CU and 5GC.

The mobile IAB nodes are mainly considered in the R18 standard, whose mobility will cause the source IAB donor CU to trigger the full migration process, and the full migration may cause the PCI conflict. However, considering the load or capacity of the base station, it is exceedingly difficult for every target IAB donor CU to support full migration or accept a request for full migration, and it is just also difficult for every source IAB donor CU that supports the full migration to trigger the full migration when migration is needed since partial migration is simpler than full migration and the time for the partial migration is shorter. Thus, it is necessary to interact the migration type between the source IAB donor CU and the target IAB donor CU. A process of one case (interaction during the Xn interface establishment procedure) is as follows.

Figure 13:
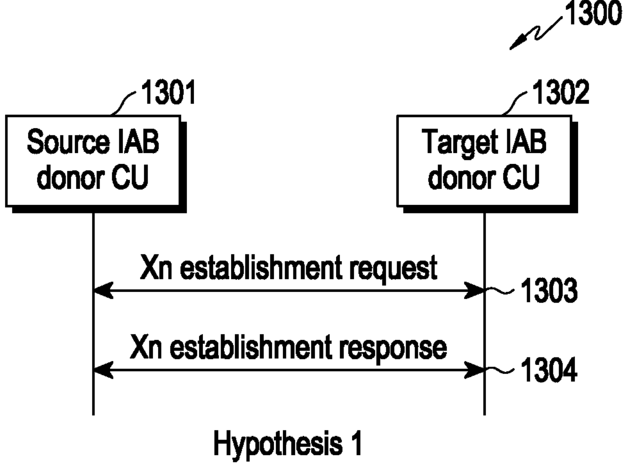
FIG. 13 illustrates hypothesis 1, according to an embodiment.

FIG. 13 illustrates hypothesis 1 1300, according to an embodiment. Specifically, in case 1, the migration type supported by the IAB donor CU will not change, as shown in FIG. 13.

The source IAB donor CU 1301 adds twelfth indication information to an Xn establishment request 1303 and transmits the twelfth indication to the target IAB donor CU 1302, which indicates the migration types supported by the source IAB donor CU 1301, such as one or both of full migration and partial migration.

The target IAB donor CU 1302 adds thirteenth indication information in an Xn establishment response 1304 as a reply, which includes information indicating the migration type supported by the target IAB donor CU 1302.

Through the Xn establishment procedure, the source IAB donor CU 1301 can know the migration type supported by surrounding target IAB donor CUs 1302. When the migrating node needs to be migrated, the source IAB donor CU 1301 may select an appropriate target IAB donor CU 1302 for handover according to its own requirement.

The twelfth indication information is optionally transmitted (because the source IAB donor CU 1301 may also become a target IAB donor CU of other source IAB donor CUs), and the thirteenth indication information must be transmitted by the target IAB donor CU 1302. When interacting indication information is on an Xn interface, the indication information transmitted by the target IAB donor CU 1302 to the source IAB donor CU 1301 must be transmitted since the source IAB donor CU 1301 determines whether to migrate the migrating node to the target IAB donor CU 1302 according to the indication information. The indication information transmitted by the source IAB donor CU 1301 to the target IAB donor CU 1302 is optionally transmitted, because in some cases, the nodes controlled by the target IAB donor CU 1302 may also migrate to the source IAB donor CU 1301, so that the source IAB donor CU 1301 will become the target donor CU 1302.

In case 2, the migration type supported by the IAB donor CU may change.

Based on case 1, when the source IAB donor CU needs to migrate a migrating node, a third message may be transmitted to a candidate target IAB donor CU satisfying its migration requirement via the Xn interface (via the handover request or other Xn interface signaling messages). The third message is used to determine whether the migration type supported by the candidate target IAB donor CU changes.

After receiving the third message, the target IAB donor CU may respond by sending a fourth message indicating the changed migration type to the source IAB donor CU. If there is no change, the fourth message indicates that there is no change.

If the migration type supported by the target IAB donor CU changes, thereby causing the requirement of the source IAB donor CU to be unsatisfied, the source IAB donor CU transmits a handover cancel message to the target IAB donor CU and carries a new cause value which is used to indicate the reason for cancelling handover, for example, the migration type cannot be satisfied.

Figure 14:
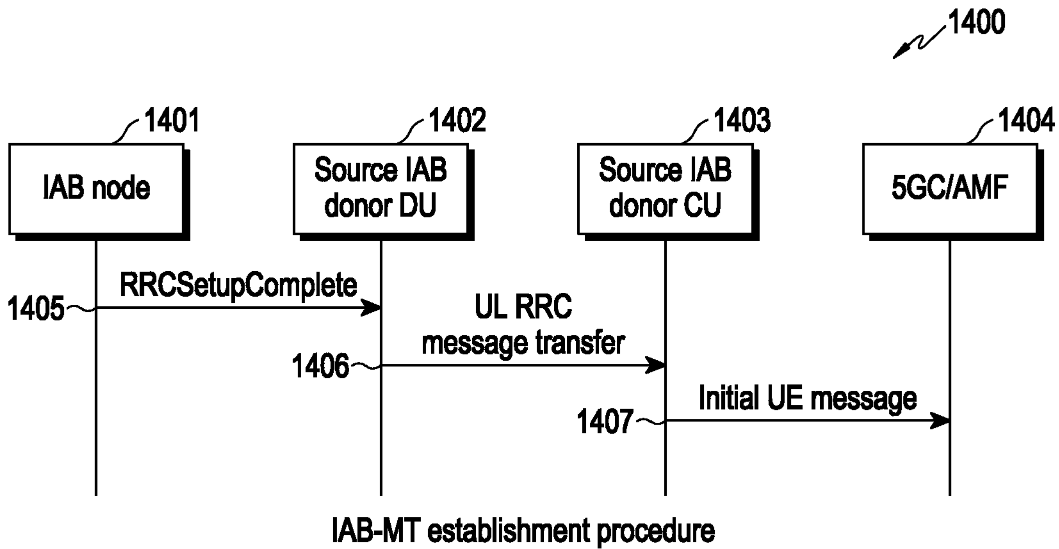
FIG. 14 illustrates an IAB-MT establishment procedure, according to an embodiment.

FIG. 14 illustrates an IAB-MT establishment procedure 1400, according to an embodiment. That is, the IAB donor CU 1401 (i.e., IAB node) also needs to inform an AMF 1404 of the supported migration type. The process in which the source IAB donor CU 1403 indicates the supported migration type to the AMF 1404 in the IAB-MT establishment procedure is as shown in FIG. 14.

In the RACH process, the IAB-MT (i.e., IAB node) 1401 may add information for indicating the migration type related to the IAB node in RRCSetupComplete 1405, such as an IAB-node indication. The information may indicate whether the IAB node 1401 is a mobile IAB node, an IAB node in R17 or an IAB node in R18, thus implicitly indicating whether full migration is possible. If the IAB node 1401 is a mobile IAB node, the IAB node may perform full migration. With such information, an IAB-donor may be assisted to select an AMF 1404 supporting the mobile IAB node 1401.

The source IAB donor DU 1402 transmits an RRCSetupComplete message 1405 to the source donor CU 1403 via a UL RRC message transfer 1406.

The source IAB donor CU 1403 interacts with the AMF 1404 and transmits, in an initial UE message 1407, fourteenth indication information via an NG interface, which includes information related to the migration type of the migrating node.

The fourteenth indication information may explicitly indicate to the AMF 1404 that the IAB node 1401 is a mobile IAB node with 1 bit. This node may perform full migration since it is the mobile IAB node, so it also implicitly indicates that the AMF 1404 needs to support full migration.

The fourteenth indication message may be indicated with 2 bits, where 1 bit is used to indicate whether the IAB node 1401 is a mobile IAB node, and the other 1 bit explicitly indicates that the AMF 1404 needs to support full migration.

The source IAB donor CU 1403 informs the AMF 1404 of whether the IAB node 1401 is a mobile IAB node, in order to facilitate authorization performed by the AMF 1404. In exemplary embodiment, the AMF 1404 performs authorization after receiving the fourteenth indication information, and then feeds back an authorization result to the source IAB donor CU 1403

In this process, the AMF 1404 may also transmit fifteenth indication information via the NG interface to indicate to the source IAB donor CU 1403 whether it supports a mobile IAB node.

Figure 15:
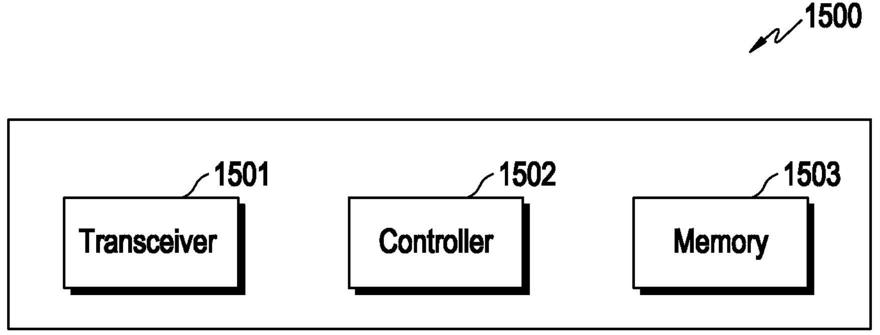
FIG. 15 is a schematic block diagram of a communication device according to an embodiment.

FIG. 15 illustrates a block diagram of an example communication device, according to an embodiment.

Referring to FIG. 15, a communication device 1500 includes a transceiver 1501, a controller 1502 and a memory 1503. Under the control of the controller 1502, which may be implemented as one or more processors, the communication device 1500 may be configured to perform the operations in the methods described herein. Although the transceiver 1501, the controller 1502 and the memory 1503 are shown as separate entities, they may be implemented as a single entity, such as a single chip. The transceiver 1501, the controller 1502 and the memory 1503 may be electrically connected or coupled to each other. The transceiver 1501 may transmit and receive signals to and from other network entities, such as another node (which may be, for example, a base station or a relay node) and/or a terminal. In some implementations, the transceiver 1501 may be omitted. In this case, the controller 1502 may be configured to execute instructions (including computer programs) stored in the memory 1503 to control the overall operation of the communication device 1500, thereby implementing the operations in the flows of the above methods.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. A method performed by an integrated access backhaul (IAB) donor node in a wireless communication system, the method comprising:

receiving, from an access and mobility management function (AMF) entity, first information indicating that the AMF entity supports a mobile IAB;

receiving, from an IAB node, a radio resource control (RRC) setup complete message including second information indicating that the IAB node is a mobile IAB node capable of performing a migration procedure;

transmitting, to the AMF entity, an initial user equipment (UE) message including the second information indicating that the IAB node is the mobile IAB node, in response to receiving the second information; and receiving, from the AMF entity, authorization result information for the mobile IAB node, in response to the second information in the initial UE message.

2. The method of claim 1, wherein the IAB donor node is a source IAB donor node and the authorization result information is used for the migration procedure of the mobile IAB node from the source IAB donor node to a target IAB donor node.

3. A method performed by an access and mobility management function (AMF) entity in a wireless communication system, the method comprising:

transmitting, to an integrated access backhaul (IAB) donor node, first information indicating that the AMF entity supports a mobile IAB;

receiving, from the IAB donor node, an initial user equipment (UE) message for an IAB node, the initial UE message including second information indicating that the IAB node is a mobile IAB node capable of performing a migration procedure;

performing authorization of the mobile IAB node based on the second information; and transmitting, to the LAB donor node, authorization result information for the mobile IAB node, in response to the second information in the initial UE message.

4. The method of claim 3, wherein the IAB donor node is a source IAB donor node and the authorization result information is used for the migration procedure of the mobile IAB node from the source IAB donor node to a target IAB donor node.

5. An integrated access backhaul (IAB) donor node in a wireless communication system, the IAB donor node comprising:

a transceiver; and at least one processor coupled to the transceiver and configured to:

receive, from an access and mobility management function (AMF) entity, first information indicating that the AMF entity supports a mobile IAB, receive, from an IAB node, a radio resource control (RRC) setup complete message including second information indicating that the IAB node is a mobile IAB node capable of performing a migration procedure, transmit, to the AMF entity, an initial user equipment (UE) message including the second information indicating that the IAB node is the mobile IAB node, in response to receiving the second information, and receive, from the AMF entity, authorization result information for the mobile IAB node, in response to the second information in the initial UE message.

6. The IAB donor node of claim 5, wherein the IAB donor node is a source IAB donor node and the authorization result information is used for the migration procedure of the mobile IAB node from the source IAB donor node to a target IAB donor node.

7. An access and mobility management function (AMF) entity in a wireless communication system, the AMF entity comprising:

a transceiver; and at least one processor coupled to the transceiver and configured to:

transmit, to an integrated access backhaul (IAB) donor node, first information indicating that the AMF entity supports a mobile IAB, receive, from the IAB donor node, an initial user equipment (UE) message for an IAB node, the initial UE message including second information indicating that the IAB node is a mobile IAB node capable of performing a migration procedure, perform authorization of the mobile IAB node based on the second information, and transmit, to the IAB donor node, authorization result information for the mobile IAB node, in response to the second information in the initial UE message.

8. The AMF entity of claim 7, wherein the IAB donor node is a source IAB donor node and the authorization result information is used for the migration procedure of the mobile IAB node from the source IAB donor node to a target IAB donor node.

* * * * *